United States Patent [19]

Creed et al.

[11] Patent Number: 4,666,722
[45] Date of Patent: May 19, 1987

[54] STERILE COOLING METHOD

[75] Inventors: Sherman H. Creed, Fresno; Robert G. Beverly, Los Gatos, both of Calif.

[73] Assignee: FMC Corporation, Chicago, Ill.

[21] Appl. No.: 713,146

[22] Filed: Mar. 18, 1985

[51] Int. Cl.$^4$ .......................... A23L 3/36; B65B 55/00
[52] U.S. Cl. ...................................... 426/393; 99/470; 426/521; 426/524
[58] Field of Search ............... 426/524, 523, 521, 232, 426/407, 412, 393; 99/355, 359, 470, 483; 422/25, 302, 304, 38

[56] References Cited

U.S. PATENT DOCUMENTS

| | | | |
|---|---|---|---|
| 2,640,328 | 6/1953 | Myers | 426/524 |
| 3,607,312 | 9/1971 | Ready | 426/412 |
| 3,812,270 | 5/1974 | Hartz | 426/412 |
| 4,088,444 | 5/1978 | Byrne | 422/25 |
| 4,164,590 | 8/1979 | Mencacci | 426/521 |
| 4,169,408 | 10/1979 | Mencacci | 99/355 |
| 4,384,463 | 5/1983 | Rica et al. | 426/524 |
| 4,385,035 | 5/1983 | Akitoshi et al. | 426/412 |

FOREIGN PATENT DOCUMENTS 1509046  4/1978  United Kingdom .................. 422/38

OTHER PUBLICATIONS

Article entitled "Microbial Contamination of Sterile Fluids in Glass Containers published in Oct. 1975, issue of Journal of Hospital Pharmacy (pp. 119–125, by N. C. Allwood.
An Article entitled "Contamination of Fluids in Spray Cooled Autoclaves published in Sep. 30, 1972, issue of The Pharmaceutical Journal by D. Higgins.
An article entitled The Pharma Hydromatic Hydrostatic Continuous Sterilizer for Sterilizing Infusion Liquids in Glass Bottles and Plastic Containers published in Pharmaceutical International, in May 1972.

Primary Examiner—George Yeung
Attorney, Agent, or Firm—L. J. Pizzanelli; A. J. Moore; R. B. Megley

[57] ABSTRACT

Disclosed is a sterilizing apparatus adapted to practice methods of sterile cooling of packaged food products or fluids. Following sterilization a variety of procedures to effect sterile cooling are presented. Sterile cooling is accomplished by sterile fluids, such as water, a solution of selected chemicals and water or sterile air which also may be combined with sterilizing gases.

15 Claims, 7 Drawing Figures

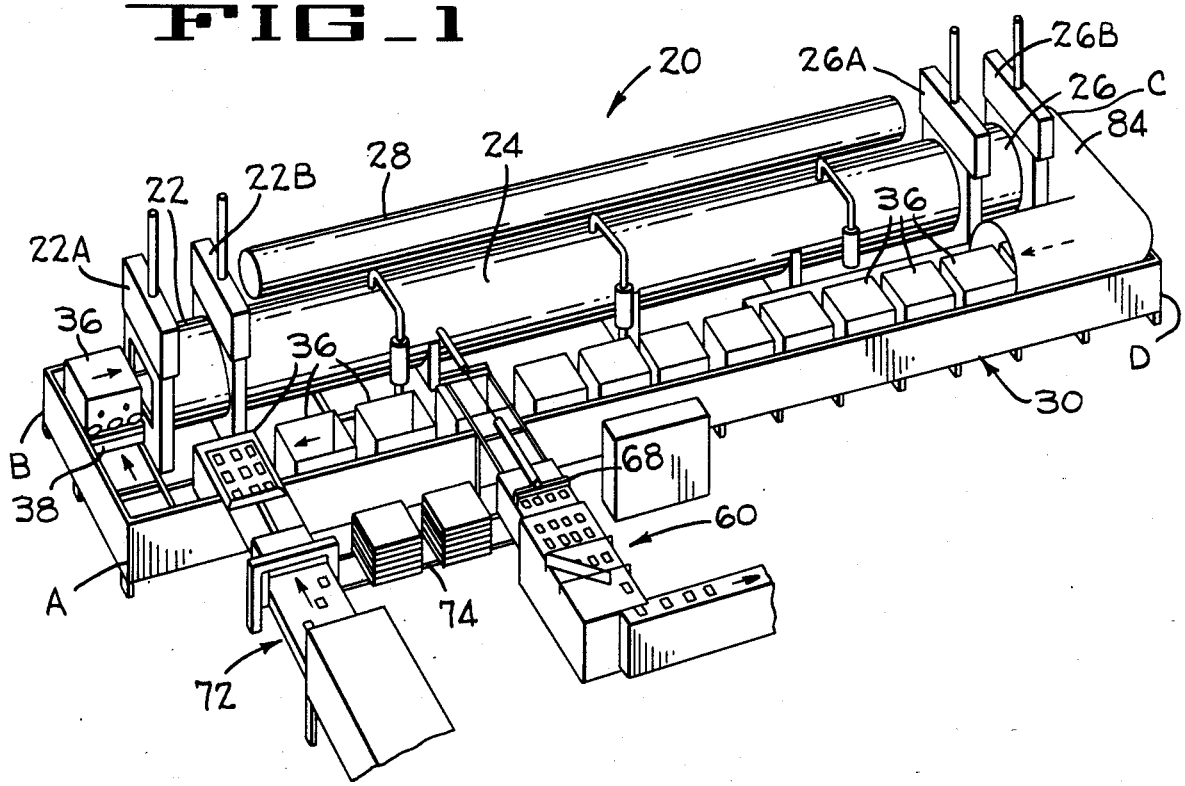
FIG_1
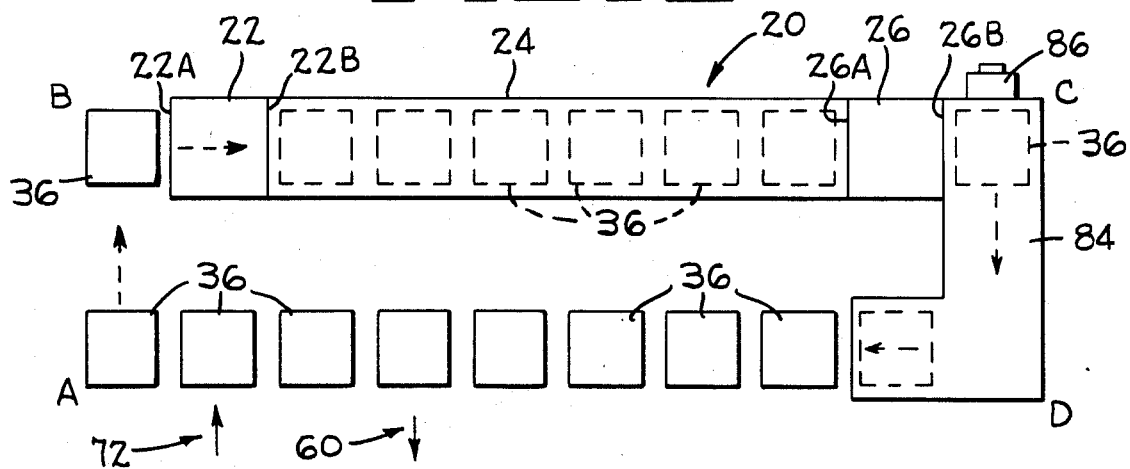
FIG_2

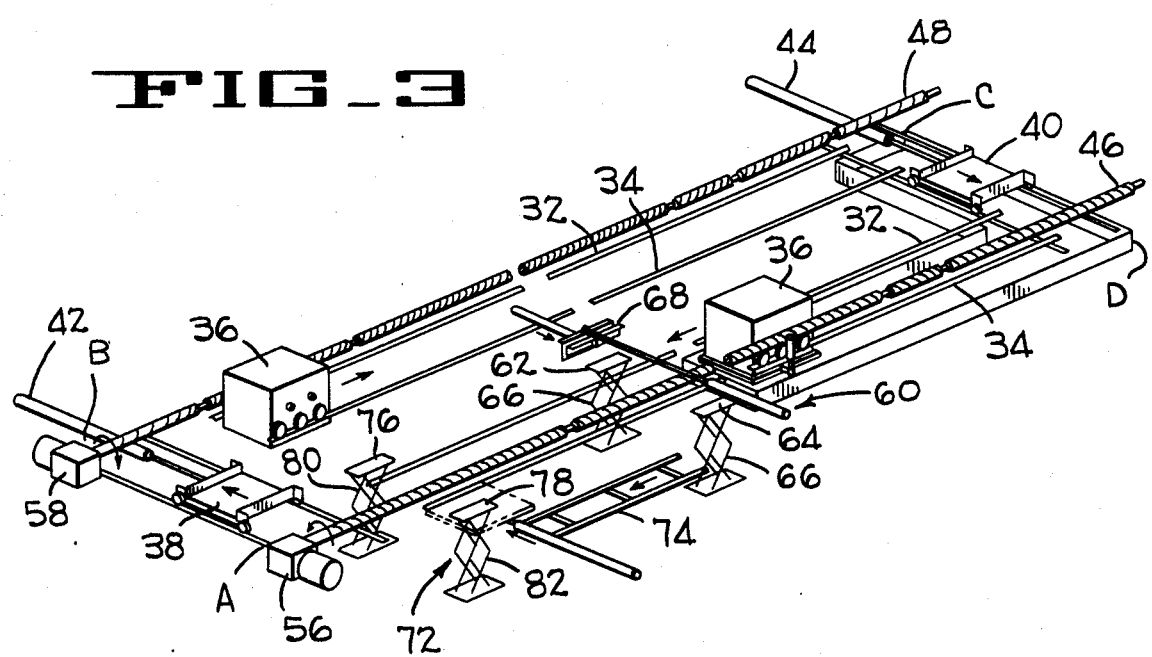
FIG_3
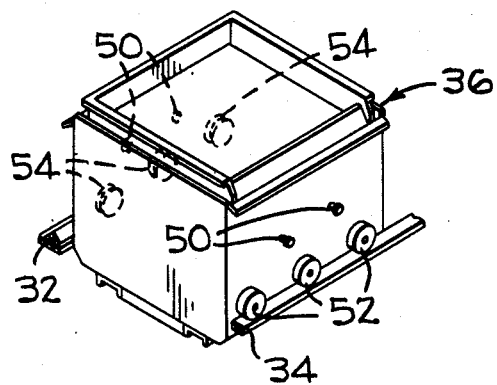
FIG_4
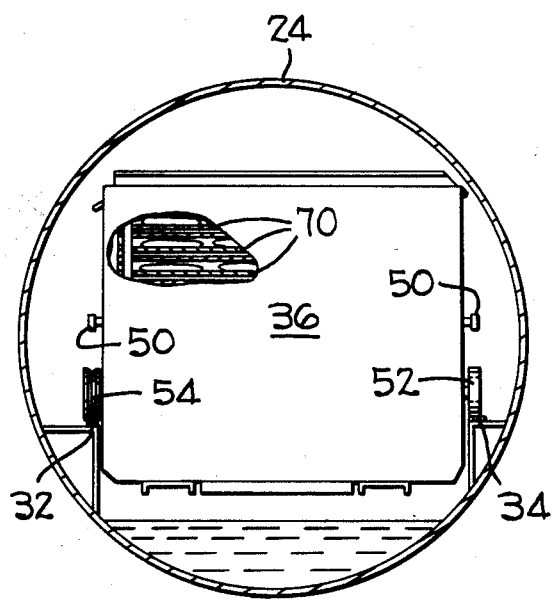
FIG_5

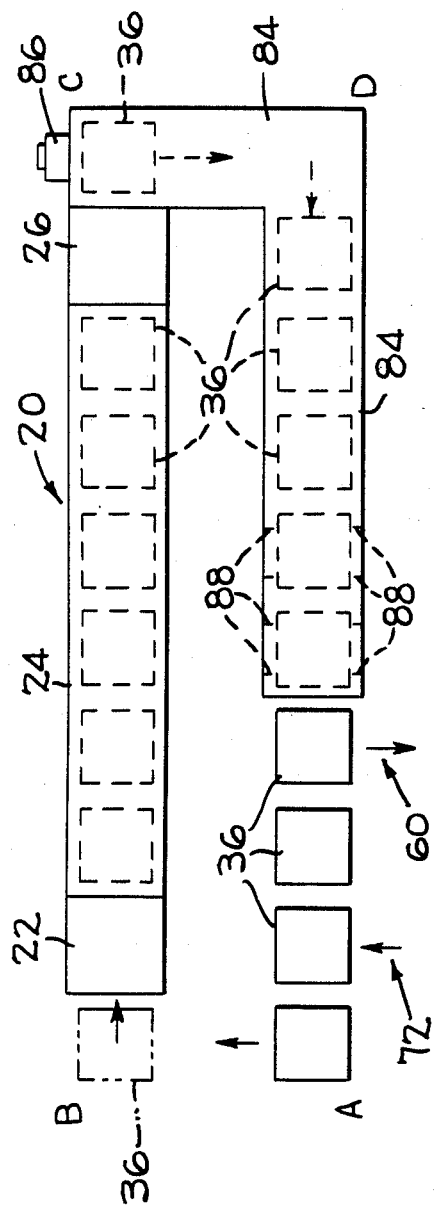
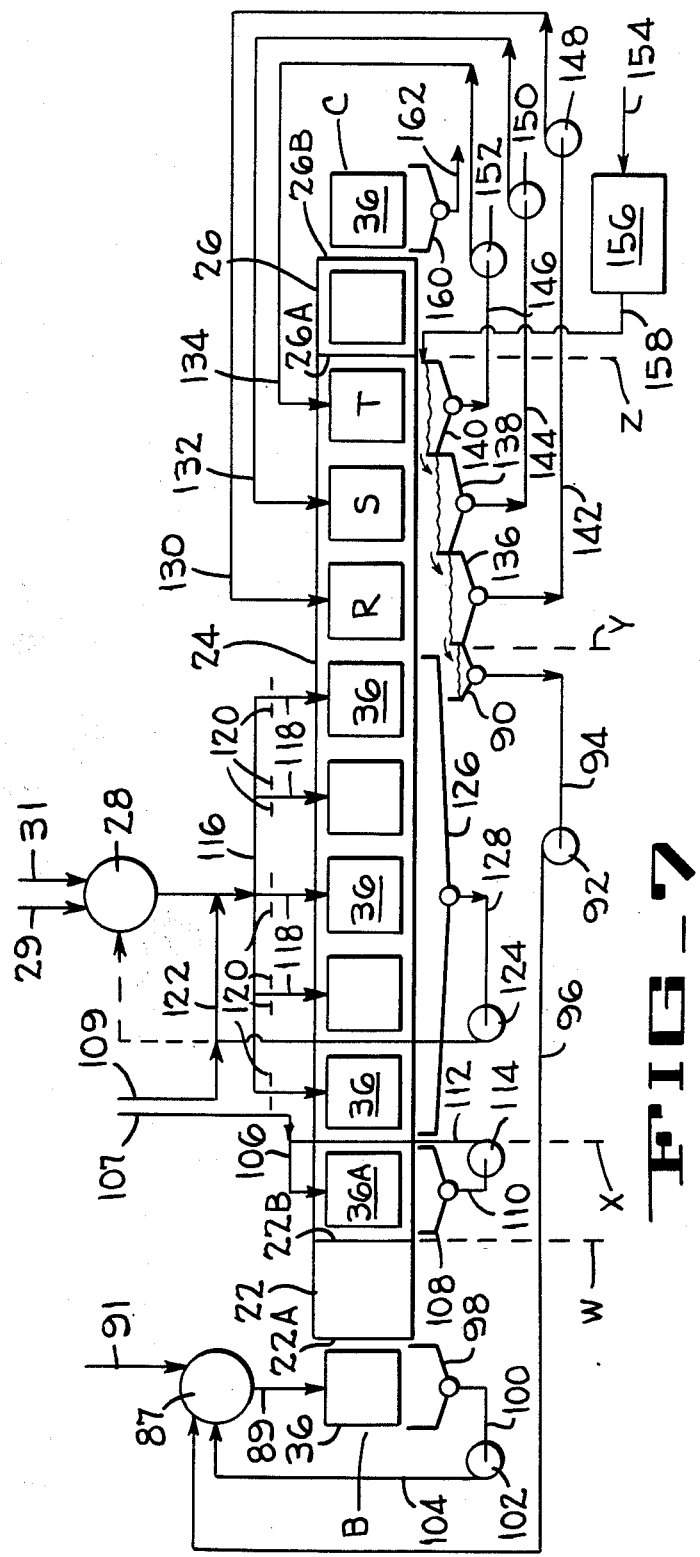

STERILE COOLING METHOD

This invention relates to sterilized packages and more particularly to cooling the packages in a sterile environment.

Publications, including patents, related to the present invention include the article "Microbial Contamination of Sterile Fluids in Glass Containers" published in the October, 1975 issued of the Journal of Hospital Pharmacy (pages 119-125) by M. C. Allwood, the article "Contammination of Fluids in Spray Cooled Autoclaves" published in the Sept. 30, 1972 issue of the Pharmaceutical Journal, by D. Higgins, "The Pharma Hydromatic Hydrostatic Continuous Sterilizer for Sterilizing Infusion Liquids in Glass Bottles and Plastic Containers" published in the Pharmaceutical Int. May 1972, Pages 914 by K. Ruig and U.S. patent application Ser. No. 579,047 to Creed et al. filed Feb. 10, 1984 and entitled "Sterilizing Apparatus". By reference thereto it is intended that the above documents be incorporated herein.

The sterilizing apparatus disclosed in the referenced Creed et al application is suitable, as disclosed, to fulfill a processing procedure which will cool sterilized packages by retaining such packages in a sterile cooling environment. With appropriate modifications to the Creed et al. apparatus and processing procedures, a user may select a procedural mode which may achieve a level of sterility required or desired. The procedure may vary depending upon the type of packages (cans, bottles or thermoplastic containers) being handled.

According to one aspect of the invention, package laden cars maintaining the packages immersed in cool sterile water are further cooled under sterile conditions by promptly introducing cars successively withdrawn from the discharge lock into a tunnel provided with an atmosphere of sterile fluids, gas or gas and liquid, maintained at a pressure greater than atmospheric pressure to thereby prevent intrusion of contaminants in the tunnel.

According to a further aspect of the invention, sterilization and cooling occur in the chamber normally allocated to effect sterilization. While primary parameters such as time, pressure and temperature and the relationship therebetween may influence the dimensions of the sterilizing chamber of the Creed et al apparatus, the opportunity to perform sterilization and sterile cooling in the sterilization chamber is presented. Accordingly, a package laden car, introduced in the sterilizing chamber from the entry lock, has introduced therein water at sterilizing temperature and water at declining temperatures before moving the car in the discharge lock. Sterilization and cooling occurring at constant pressure.

BRIEF DESCRIPTION OF THE DRAWINGS

FIG. 1 is a perspective of a sterilizer adapted to perform the various processing methods according to the present invention, FIG. 2 is a schematic plan illustrating a preferred circuit in which package laden cars are moved during the process of loading packages in the car, introducing the cars in the sterilizer and maintaining the cars in a sterile environment during the cooling processing, FIG. 3 is a diagrammatic perspective illustrating the mechanical components for translating package laden cars in a generally rectangular closed circuit, FIG. 4 is a perspective of a car adapted for use in the sterilizing apparatus, FIG. 5 is a transverse section of the sterilizing chamber and a package laden car residing therein, FIG. 6 is similar to FIG. 2 but additionally illustrates one form the cooling tunnel can take to fulfill sterile cooling, and FIG. 7 is a diagrammatic illustration of a fluid handling and distribution system which may be utilized in the event the sterilizing chamber is used to practice the method of sterilizing and sterile cooling in the sterilizing chamber.

DESCRIPTION OF PREFERRED EMBODIMENTS

The sterilizing apparatus shown in FIG. 1, and generally designated by the numeral 20, is similar to the apparatus disclosed in the above-referenced Creed et al. application but is modified, in construction and mode of operation, to effect sterile cooling as will be pointed out hereafter. The sterilizing apparatus 20 is constructed to provide three communicating chambers which include a entry lock 22, a sterilizing chamber 24 and a discharge lock 26. A hot well 28 contains processing fluids, which may be water, air and/or steam supplied to the sterilizing chamber 24 and to the locks 22 and 26. Steam and air are supplied to the hot well by lines 29 and 31 (FIG. 7), respectively. Each of the locks is provided with a pair of doors 22A and 22B for the entry lock 22, and doors 26A and 26B for the discharge lock 26. A frame structure 30, of generally rectangular configuration, supports tracks 32 and 34 (FIG. 3) extending between verticies A,B,C and D, being points at which the direction of movement of cars 36 change. Tracks 32 and 34 between points B and C, extend through the entry lock 22, the sterilizing chamber 24, and the discharge lock 26. Movement of a car between points A-B and points C-D, is effected by carriages 38 and 40, which are displaced between these points of linear actuators 42 and 44. The carriage 38 is aligned with the track sections 32 and 34 at point A to receive a car 36 and, in response to the actuation of the linear actuator 42, the car is carried by the cradle to point B adjacent the entry lock 22 and is transferred into lock 22. The unburdened carriage is then repositioned at point A to receive another car. By the same token and in similar fashion, the carriage 40 receives a car from the discharge lock 26 when at point C and is then displaced by means of the linear actuator 44 to point D. Along the parallel sections of track 32 and 34, elongate car displacing screws 46 and 48 engaging driving lugs 50 (FIG. 4) on the cars. The rotary motion of the screws is transferred to effect linear movement of the cars along the sets of tracks 32 and 34. Each of the cars 36 include sets of wheels 52 having a flat rim which rides on track 34, and wheels 54 having a grooved rim which rides on the track 32 which is preferably an angle iron having it apex facing upwardly. Each of the screws 46 and 48 are driven, respectively, by drives 56 and 58.

In the course of translating car from point D to point A, the car is located at an unloading station 60 whose construction and mode of operation is shown and described in the above-reference Creed at al. application. However, a brief description of its mode of operation will be given. The principal components of the unloading station comprise platforms 62 and 64, which are raised and lowered by scissor-type jacks 66, and an overhead clamping and transfer device 68 being operative to engage and transfer trays laden with packages from the cars 36 to the platform 64. As shown in FIG. 5 each car 36 contains a stack of package-laden trays 70 which are successively removed from the car by the clamping and transfer device 68. More particularly it should be noted that the platform 62 is located between the tracks 34 and 34. When a car is positioned at the unloading station 60 the platform 62 is in its lowered position to allow location of a car 36 thereover. At the same time the platform 64 is in its raised position. Unloading of the car is effected by incrementally raising the platform 62 so that the clamping and transfer device 68 engages the uppermost tray and transfers it to the platform 64 which in turn is incrementally lowered to receive a tray position thereover. This process continues until the entire car is unloaded of its tray and the stack of trays is thereafter transferred to a loading station 72. The trays are transferred between the unloading station 60 and the loading station 72 by a conveyor 74 which may be associated with automatic means for removing the packages from the successive trays. On positioning a car at the loading station 72, it is loaded with a series of package-laden trays. It will also be evident that the loading station includes platforms 76, 78 raised and lowered by scissor-type jacks 80 and 82, respectively.

One approach in effecting sterile cooling of the packages in a car by use of the preferred disclosed sterilizing apparatus would involve introducing a car in the discharge lock 26, and while the doors 26A and 26B are closed, introducing sterile cooling water into the car. More specifically, the average conditions in the sterilizing chamber 24 are such that sufficient overriding air pressure balances the internal package pressure, maintains sterilizing medium such as water or steam at about 250 degrees F. The resident time of the car in the sterilizing chamber 24, that is, from the door 22B to the door 26A, fulfills the object of complete sterilization of the packaged product prior to entry into the discharge lock 26. When a car is introduced into the discharge lock 26 and is isolated from the sterilizing chamber 24 by closing the doors 26A and 26B, it will retain the heating fluid at sterilizing temperature and thus keep the packages immersed in the fluid. After isolating the car with 250 degree F. water in the discharge lock 26, sterile water ranging in temperature from 70 to 150 degrees F. is introduced into the car for a period of time judged to at least displace the higher temperature sterilizing fluid. The introduction of sterile cooling water may continue until thermal balance is achieved for a selected period of time calculated to effect micro cooling of the head space gases. Final cooling can occur under ambient conditions after the car is discharged or removed from the discharge lock 26 as invasion of deleterious components contained in the environment is reduced since the packages are maintained immersed in the sterile cooling water. While the cars of the disclosed preferred sterilizing apparatus travel in a generally rectangular circuit, it will be understood that the cars containing the sterile cooling water can be lifted and set aside at any appropriate location to complete cooling, which complete cooling would be evidenced by achieving a thermal balance. As mentioned above, sterile conditions will be maintained since the packages carried by the car are maintained immersed in sterile water.

In accordance with another aspect of the present invention the process of sterile cooling may utilize a chamber in communication with the discharge lock provided with a sterile atmosphere, such as sterile air solely or air in combination with other sterile fluids to effect sterile cooling with or without cooling by sterile water in the discharge lock 26. FIG. 2 schematically represents such a system where it will be seen that a shell 84, connected in an airtight fashion to the exterior of the discharge lock 26 extends from points C to D and partially along the path DA, is provided to confine a stream of sterile air continually injected into the shell by a suitable blower of fan 86 connected to a source of sterile fluid. The rate at which air is introduced into the shell 84 is such that a positive pressure is created in the shell which effectively prevents the entrance of ambient air into the shell and accordingly sterile conditions are maintained during the cooling process within the shell 84.

In the same vein, the diagrammatic illustration of FIG. 6 modifies the arrangement shown in FIGS. 1 and 2 by extending the shell 84 to the unloading station 60. The level of pressure in the shell 84 is increased by providing baffles 88 operating to throttle the sterile fluids injected by the fans 86 in the course of being discharged to the atmosphere. The baffles may take various forms and may be arranged, in geometry and number, to adjust the pressure drop as may be desired by specific processing objectives. For example, the baffles may take the form of rubber flaps frictionally engaging the sides of the car passing thereby or may be rigid members whose spacing between the outer surface of the car and the inner edge of the baffle will establish a desired pressure drop. By this measure the resident time of the sterile air enveloping the cars in the shell 84 is increased and, as in the case of the arrangement shown in FIG. 2, the invasion of exterior atmospheric air is significantly reduced or prevented depending upon the dynamics of the fluid.

FIG. 7 illustrates a modification whereby sterilization and sterile cooling occur in the chamber 24 between the entry and discharge locks 22 and 26. In this process, sterile cooling occurs under pressure and if desired, cooling can occur partially in the pressure vessel 24 and partially in a discharge lock 26. Such an approach is viable because sterilization is achieved by using hot water at approximately 250 degrees Farenheit while cooling, by using sterile water, can incrementally decreased from 150 degrees Farenheit to 70 degrees Farenheit in the pressure chamber 24. Sterilization occurs during hot water immersion and is unaffected by vapor condensation from the cooling water. While it is recognized that some energy loss may occur as a result of cooling in the sterilizing chamber, the loss is deemed acceptable.

The apparatus as shown in FIG. 7 is a particular adaptation of the sterilizing apparatus disclosed in the referenced Creed et al. application. It is to be understood that the water collection and recirculating components described hereinafter are contained within the sterilizing chamber 24. On locating successive cars 36 at the point B of the circuit, preheating of its charge of packages is accomplished by discharging water ranging in temperature from 180 to 250 degrees Farenheit from a reservoir 87 into and over a car by a line 89 which may be associated with a spreading unit or sprayhead to evenly distribute water into the car. The reservoir 87 is supplied with steam by a line 91 and with water at approximately 250 degrees Farenheit from a trough 90 connected to the inlet of a pump 92 by a line 94 and a line 96 connecting the discharge of the pump 92 with the reservoir 87. Underlying the car a point B is a collecting trough 98 from which water is returned to the reservoir by a line 100 connected to the inlet of a pump 102 returning the water to the reservoir 87 by a line 104 connected to the discharge of the pump. The period of time selected for preheating the car and its contents while at point B is optional but it is essentially determined by the process parameters of time and temperature required to effect sterilization in the shell or chamber 24. After a lapse of a selected period of time, the car at position B is introduced into the entry lock 22. After the doors 22A and 22B are closed, the lock may be sterilized by saturated or superheated steam and pressurized by sterile air or air mixed with chemical sterilizing fluids such as ozone, hydrogen peroxide or chlorine until its pressure is equal to the pressure in the chamber 24. On achieving pressure balance, the door 22B is opened and the car assumes the position indicated by 36A where an independent water distributing and return system is provided. At this position the car and its contents are rapidly brought up to sterilizing temperature. It should be noted that four datum planes W, X, Y, and Z are shown in FIG. 7. The car position between datum W and X is the position where rapid increase to sterilization temperature occurs, cars located between the datum planes X and Y are subjected to sterilization, and cars between datum planes Y and Z are subjected to sterile cooling.

One positioning of a car between planes W and X, water at sterilizing temperature, for example 250 degrees Farenheit, is discharged into the car at a nominal rate of 450 gallons per minute by a line 106. The temperature of 250 degrees Farenheit is maintained by conventional controls regulating the injection of steam by line 107 in line 106. Water overflow is collected in a underlying trough 108 and returned to the line 106 by lines 110 and 112 connected, respectively, to the inlet and the discharge of a pump 114. To maintain the water at sterilizing temperature, heat exchangers supplied with steam and connected to temperature monitoring devices, such as disclosed in the referenced Creed et al. application, may be used.

Cars located between datum planes X and Y are continually supplied with water at sterilizing temperature from a header or manifold 116 in communication with branch lines 118 whose nominal flow rate of 450 gallons per minute is maintained by orifices 120 in each of the branch lines 118. While not shown, a return line 122 connected to the discharge of a pump 124, withdrawing water from a trough 126 through a line 128. The return line 122 is associated with a heat exchanger and suitable controls for introducing steam by line 109 in the line 122 to maintain the water at a selected sterilizing temperature, in this case 250 degrees Farenheit.

As successive cars are located between the datum planes Y and Z, the segment of the chamber 24 allocated to effect sterile cooling, the cars 36 in positions R, S and T receive sterile cooling water at declining temperatures. More specifically, the car at position R is supplied by a conduit 130 with sterile water at approximately 150 degrees Farenheit. Sterile water suppled to a car at position S by a line 132 is approximately 120 degrees Farenheit and a car at position T is supplied with sterile cooling water by line 134 at approximately 90 degrees Farenheit. Water falling through and out of the cars at positions R, C and T is collected in underlying troughs 136, 138 and 140, respectively and returned to lines 130, 132 and 134 by drain lines 142, 144, and 146 which are also connected, respectively, to the inlet of pumps 148, 150, and 152.

Cooling water is supplied to the cooling section YZ by a conduit 154. The water passes through a filtering device 156 and, by line 158, water is discharged into the trough 140. While it is not shown, the filtering device may include or be connected in a series with a heat exchanger functioning to maintain the water temperature in line 158 at a desired temperature level. If desired sterilizing chemicals may be added to the water.

It will be noted that the trough 90, 136, 138 and 140 communicate with each other to the extent that overflow from the trough 140 is received by the trough 138 and in turn overflor from the trough 138 is received by the trough 136 which discharges its overflow into the trough 90. While there is some mixing of different temperature water by this arrangement, water of the temperature range desired is achieved.

Before moving a car from position T into the discharge lock 26, a variety of measures and combinations thereof may be utilized to achieve sterile conditions before and during transfer of a car into the discharge lock 26. Discharge of a car from the discharge lock 26 to point C occurs when the door 26B is opened allowing the car to be moved. Thereafter, the door 26B is closed and the discharge lock is prepared to receive the succeeding car from position T. Before reception of the car the discharge lock is sterilized and such sterilization can be achieved by use of variety of fluids including water at the sterilization temperature, superheated or saturated steam or steam mixed with a chemical solution. Raising the pressure level of the discharge lock prior to opening the door 26A may be achieved by introducing sterile air. In any event, when measures have been taken to sterilize the discharge lock 26 and to raise its pressure to equal the pressure in the chamber 24, the door 26A is opened and the car is moved from position T into the discharge lock. The car is isolated therein on closing of the door 26A and when so isolated, and if desired, its level of temperature can be determined to judge whether discharge of the car into the atmosphere to point C is appropriate.

If desired the car positioned at point C outside of the discharge lock may be drained into a trough 160 having a line 162 connected to a drain.

In view of the above preferred construction and procedures for effecting sterile cooling, it is to be recognized, depending on the objectives to be achieved, to combine and rearrange the apparatus in a variety of ways, one being to include a tunnel or shell 84 shown in FIGS. 1, 2 and 6 with the apparatus shown in FIG. 7 in the event the level of sterile cooling desired requires additional residence time in a sterile atmosphere.

Although the best mode contemplated for carrying out the present invention has been herein shown and described, it will be apparent that modification and variation may be made without departing from what is regarded to be the subject matter of the invention.

What is claimed is:

1. A method of sterile cooling and reducing the internal pressure of sterilized packages supported in a car having an overflow port by condensing head space gases in the packages, said cooling commencing after said packages have been initially heated to a sterilizing temperature by a sterile heating fluid introduced from a sterile environment, said method comprising the steps of: maintaining the packages submerged in the heating fluid in the cart at a temperature substantially equal to the selected sterilizing temperature, moving the car and the submerged packages into a sterilized discharge chamber, sealing the chamber from said sterile environment, displacing the heated fluid from the car at substantially sterilizing temperature by introducing sterile cooling water ranging in temperature from about 70° to 150° Fahrenheit into the car causing the heated fluid and cooling water to overflow from the car for a period of time sufficient to condense condensible head space gases in the packages, opening the discharge chamber, moving the car and packages in the cooling water out of the discharge chamber, and continue cooling outside the discharge chamber while the packages remain submerged in the sterile cooling water.

2. The method of sterile cooling according to clam 1 wherein said discharged chamber is sterilized by steam before the sterilized packages are introduced therein.

3. The method of sterile cooling according to claim 1 wherein sterilization of said discharge chamber is affected by filling the chamber with water at a temperature of 212° Fahrenheit before the sterilized packages are introduced therein.

4. The method of sterile cooling according to claim 1 wherein sterilization of the discharge chamber is affected by connecting the chamber to a source of superheated steam before the sterilized packages are introduced therein.

5. The method of sterile cooling according to claim 1 wherein sterilization of the discharge chamber is affected by connecting the chamber to a chemical sanitizing solution before the sterilized packages are introduced therein.

6. The method of sterile cooling according to claim 1 wherein the sterile cooling water affecting displacement of the heated fluid at substantially sterilizing temperature contains a sanitizing chemical in solution before the sterilized packages are introduced into the discharge chamber.

7. A method of sterile cooling and condensing head space gases in packages thermally processed by a heated sterilizing fluid when the packages are supported in a car having an overflow port when in one chamber and thereafter introducing the car and packages into another communicating chamber isolatable from said one chamber while the packages remain immersed in the heated sterilizing fluid in the car, said method comprising the steps of: pressurizing said another chamber with sterile gaseous fluid at a pressure substantially equal to the pressure in said one chamber, moving the car with the immersed packages therein into said another isolatable chamber and thereafter isolating the car and immersed packages from said one chamber, displacing the heated sterilizing fluid from said car and said another chamber in which the packages are immersed with a sterile cooling fluid for cooling the packages and to effect condensation of head space gases, transferring the car and cooled packages into a flowing stream of sterile gaseous fluid to effect further sterile cooling of the packages, and restricting the flow of sterile gaseous fluid for increasing the pressure thereof for precluding contact of the packages by a contaminated environment when in said sterile gaseous stream.

8. The method according to claim 7 wherein said another chamber is sterilized following movement of the immersed packages to the sterile gaseous stream.

9. The method according to claim 7 wherein sterilization of said another chamber is affected by injecting a fluid selected from the group consisting of saturated steam, superheated steam, ozone, hydrogen peroxide and chloride into said another chamber while venting non-sterile air to the atmosphere.

10. The method of claim 7 wherein the packages being introduced in said one chamber and thereafter introduced into said another chamber are immersed and maintained immersed in water at a sterilizing temperature while being displaced from their entry toward the exit of said one chamber, and displacing the water at sterilizing temperature with sterile cooling water as the packages approach the exit of said one chamber.

11. The method of claim 10 wherein the packages, prior to being introduced in said one chamber reside in an entry lock pressurized to a level substantially equal to the pressure in said one chamber and preheated by being immersed in water at a temperature lower than sterilizing temperature.

12. The method of claim 10 wherein the packages are successively immersed in sterile cooling water at successively lower temperature than the temperature of the sterilizing water as the packages are displaced toward the exit of said one chamber.

13. The method of claim 10 wherein the sterile cooling water contains hydrogen peroxide, ozone, or chloride.

14. The method of claim 10 wherein the immersed cooled packages are located in said another chamber in the form of a sterilized discharge lock, communicating with said one chamber, where further sterile cooling, by sterile air and sterile water occurs.

15. The method of sterile cooling product filled and sealed packages supported in a sterile water filled car having an overflow port after being sterilized in hot water in a pressure sterilizing apparatus having an inlet lock, a sterilizing chamber and a discharge lock, comprising the steps of:
sterilizing the discharge lock;
moving the sterilized packages from the sterilizing chamber into the discharge lock while being subjected to an overriding air pressure;
sealing the car and packages within said lock;
directing cool sterile water into the car for causing the hot water to overflow from the car until the temperature of the water in the car is maintained at a temperature below the boiling point of the water;
opening the discharge lock; and
moving the car with sterile cooling water and submerged sterilized packages therein out of the discharge lock for continued cooling of the packages while submerged within the sterile water in the car.

* * * * *